March 20, 1934.  H. W. STRONG  1,951,713
PRODUCTION OF HYDROCARBONS OF LOW BOILING POINT
FROM THOSE OF HIGHER BOILING POINT
Filed March 25, 1930
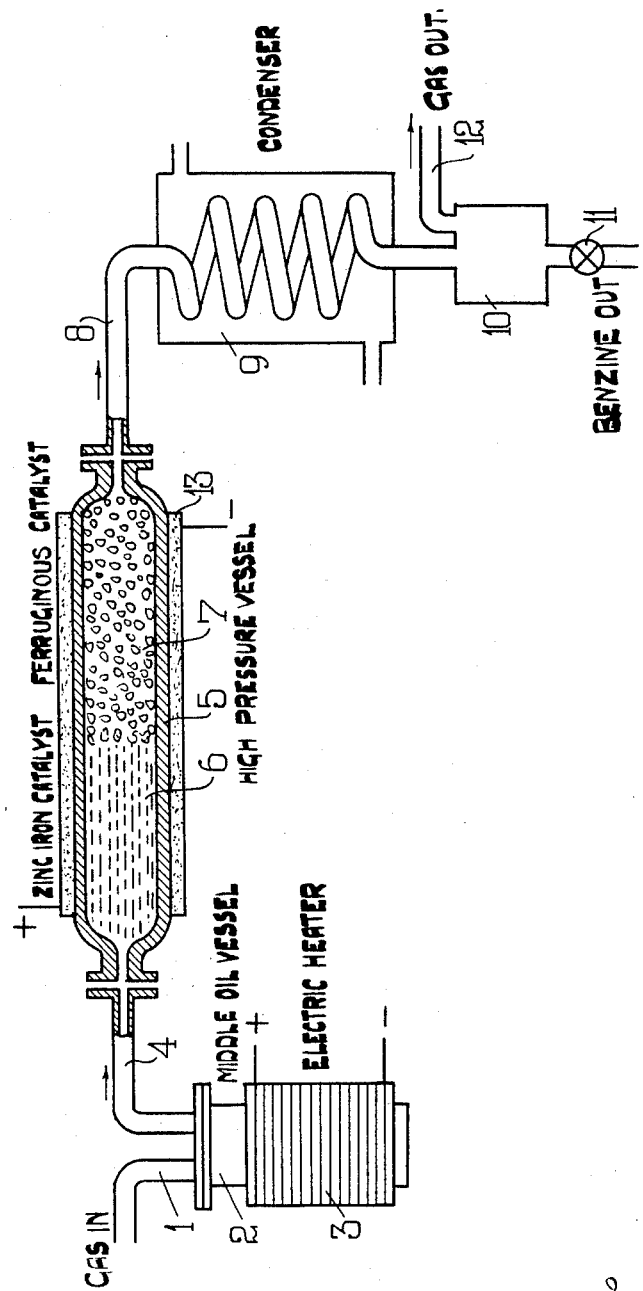

Patented Mar. 20, 1934

1,951,713

UNITED STATES PATENT OFFICE 1,951,713

PRODUCTION OF HYDROCARBONS OF LOW BOILING POINT FROM THOSE OF HIGHER BOILING POINT

Howard William Strong, Norton - on - Tees, England, assignor to Imperial Chemical Industries Limited, London, England, a British company Application March 25, 1930, Serial No. 438,907
In Great Britain April 2, 1929

6 Claims. (Cl. 196—53)

This invention relates to the production of hydrocarbons of low boiling-point from those of higher boiling-point, such as oils known as middle oils, by a process of destructive hydrogenation in the presence of catalysts.

It is known that middle oil vapours, for example, can be converted into light hydrocarbons by passage with hydrogen under pressure, at an elevated temperature, over catalysts of various kinds.

According to the present invention vapours of hydrocarbons of high boiling-point, such as middle oils, are passed together with hydrogen at an elevated temperature, over a contact mass consisting of iron coated with zinc and then over a porous ferruginous contact mass. The term "porous ferruginous contact mass" is employed as including ferric oxide or a chemical equivalent thereof, i. e. any substance which, under the working conditions, would exist as or be converted into the same substance as that into which ferric oxide is converted, as it is probable that under the working conditions ferric oxide is wholly or partly reduced, for instance to metallic iron. A suitable catalyst may for example be prepared by precipitating ferric hydroxide from a solution of ferric chloride by means of ammonia, drying, granulating and pelleting the precipitate and reducing the pellets in a current of hydrogen at the ordinary pressure and at a temperature of 500° C. The iron coated with zinc is preferably used as a massive catalyst and it may be in the form of gauze or wire. The ferric oxide catalyst may also contain small amounts of activating or other substances such as oxides which are not reduced under the reaction conditions, e. g. alumina.

Preferably the working pressure is 20 atmospheres or over, and elevated temperatures e. g. above 400° C. are employed. The vapours are passed directly from the one contact treatment to the other, the two contacts being arranged either in separate vessels or in the same vessel. The reaction vessel may be constructed of iron, steel or any other usual material of construction. Alternate layers of iron coated with zinc and of porous ferruginous contact mass may be employed in the same vessel. Generally speaking the same temperature should be employed for both contact treatments, whether the separate contacts be arranged in the same or in different vessels. If separate vessels are used, however, it may be convenient to employ different temperaturs in the two treatments, for example the iron-zinc contact may be maintained at 460° C. and the ferric oxide contact at 500° C. The pressure employed should remain the same throughout the sequence of catalytic treatments.

Example

Middle oil (boiling-point 200° C.-300° C.) from the liquid-phase hydrogenation of bituminous coal was vaporized and passed in a stream of hydrogen under a total pressure of 25 atmospheres over two contact masses in series arranged in the same high-pressure vessel and both heated to 500° C. The amount of hydrogen supplied was 100 cubic metres per ton of middle oil, representing a large excess over that required for the reaction. The contact masses consisted (1) of iron wire coated with zinc, used in the form of superposed layers of gauze and (2) of ferric oxide prepared by precipitation of the hydroxide followed by drying, ignition and pelleting.

The gaseous products were cooled to condense the low-boiling hydrocarbons.

The invention may be performed in the apparatus shown in the accompanying drawing.

Hydrogen is led by the pipe 1 through the vessel 2 which is heated electrically by the heater 3, and which contains middle oil. The vapors of middle oil mixed with hydrogen pass through the tube 4 into the vessel 5 where it comes into contact with the catalyst of zinc-coated iron 6 and the ferruginous catalyst 7. The vapor then passes out by the pipe 8 to the condenser 9 and is collected in the catch pot 10, from which it is withdrawn through valve 11. The gas passes out by pipe 12. The vessel 5 is heated by heater 13.

I declare that what I claim is:—

1. In the destructive hydrogenation of hydrocarbon vapors, the step of passing such vapors together with hydrogen at a temperature of at least 400° C. and under a pressure of at least 20 atmospheres, first over a catalyst comprising metallic iron coated with zinc and then over a porous ferruginous catalyst.

2. A process for the destructive hydrogenation of hydrocarbon vapors, which comprises passing said hydrocarbon vapors together with hydrogen at a temperature of at least 400° C. and under a pressure of at least 20 atmospheres over a catalyst consisting of iron coated with zinc, and then passing the resulting product at a higher temperature over a porous ferruginous contact mass.

3. A process of destructively hydrogenating hydrocarbons in the vapor phase which comprises passing hydrocarbon vapors and hydrogen at a temperature of at least 400° C. and under a pressure of at least 20 atmospheres over a catalyst consisting of iron coated with zinc and then over a porous ferruginous contact mass, both catalysts being contained in the same reaction space.

4. In the destructive hydrogenation of carbonaceous material, the step of contacting such carbonaceous material together with hydrogen at a temperature between 400 and 500° C. and under a pressure of at least 20 atmospheres with a catalyst comprising iron coated with zinc and then over a second contact mass.

5. In the destructive hydrogenation of hydrocarbons in the vapor phase, the step of passing the vapors and hydrogen at a temperature of at least 400° C. and under a pressure of at least 20 atmospheres over a catalyst comprising iron coated with zinc and then over a porous ferruginous contact mass which is at least partially reduced to metallic iron.

6. In a process for the destructive hydrogenation of carbonaceous materials, the step of contacting said carbonaceous materials and a hydrogenating gas at a temperature of at least 400° C. and under pressures of at least 20 atmospheres with a catalyst comprising metallic iron coated with zinc and then with ferric oxide.

HOWARD WILLIAM STRONG.